(12) United States Patent
Erdmann

(10) Patent No.: US 8,261,947 B2
(45) Date of Patent: Sep. 11, 2012

(54) PORTABLE FUEL CONTAINER EMISSIONS CONTROL

(75) Inventor: Matthew Lorenz Erdmann, Ypsilanti, MI (US)

(73) Assignee: Eaton Corporation, Cleveland, OH (US)

( * ) Notice: Subject to any disclaimer, the term of this patent is extended or adjusted under 35 U.S.C. 154(b) by 552 days.

(21) Appl. No.: 12/468,106

(22) Filed: May 19, 2009

(65) Prior Publication Data

US 2010/0294379 A1 Nov. 25, 2010

(51) Int. Cl.
*B67D 7/76* (2010.01)
*B65D 5/72* (2006.01)

(52) U.S. Cl. ............. 222/189.09; 222/189.07; 222/566; 96/6; 96/155; 96/219

(58) Field of Classification Search ............ 222/189.07, 222/189.09, 566; 96/6, 155, 219
See application file for complete search history.

(56) References Cited

U.S. PATENT DOCUMENTS

| | | | |
|---|---|---|---|
| 862,420 A * | 8/1907 | Thompson | 222/189.07 |
| 4,136,796 A * | 1/1979 | Dubois et al. | 220/259.4 |
| 4,476,995 A * | 10/1984 | Bellino et al. | 220/371 |
| 4,595,130 A * | 6/1986 | Berney | 222/539 |
| 5,406,994 A * | 4/1995 | Mitchell et al. | 141/198 |
| 5,522,769 A * | 6/1996 | DeGuiseppi | 454/270 |
| 5,971,221 A * | 10/1999 | Schwarz | 222/189.09 |
| 6,095,356 A * | 8/2000 | Rits | 215/261 |
| 6,117,319 A * | 9/2000 | Cranshaw | 210/232 |
| 6,244,472 B1 * | 6/2001 | Hennemann | 222/189.09 |
| 6,644,515 B1 * | 11/2003 | Campbell | 222/189.09 |
| 6,866,056 B1 * | 3/2005 | Scott | 137/15.18 |
| 6,942,124 B2 * | 9/2005 | Dehn et al. | 222/189.09 |
| 7,240,809 B2 * | 7/2007 | Godfrey | 222/189.07 |
| 7,261,093 B2 * | 8/2007 | Groom et al. | 123/520 |
| 7,491,258 B2 * | 2/2009 | Gouzou et al. | 95/46 |
| 7,833,321 B2 * | 11/2010 | Kawai et al. | 96/6 |
| 2006/0081652 A1 * | 4/2006 | Press | 222/189.06 |
| 2006/0180613 A1 * | 8/2006 | Manesis | 222/189.09 |
| 2007/0023016 A1 * | 2/2007 | Mills et al. | 123/520 |
| 2010/0101542 A1 * | 4/2010 | Zulauf et al. | 123/519 |

FOREIGN PATENT DOCUMENTS

| | | |
|---|---|---|
| EP | 0834456 A2 | 4/1998 |
| WO | 9401340 A1 | 1/1994 |

* cited by examiner

*Primary Examiner* — Kevin P Shaver
*Assistant Examiner* — Nicholas Weiss
(74) *Attorney, Agent, or Firm* — Quinn Law Group, PLLC

(57) ABSTRACT

An emissions device for use with a portable fuel container assembly is provided. The emissions device includes an emissions housing configured to be mounted to the portable fuel container. The emissions housing defines at least one device opening. A membrane is supported by the emissions housing and allows the passage of the vapor and prevents the passage of a liquid. An emissions filter is also located within the emissions housing and is located such that vapor exiting through the device opening must pass the emissions filter.

17 Claims, 4 Drawing Sheets

PORTABLE FUEL CONTAINER EMISSIONS CONTROL

TECHNICAL FIELD

The invention relates to a portable fuel container, and more particularly, to a portable fuel container assembly designed to control fuel emissions.

BACKGROUND OF THE INVENTION

Portable fuel containers are commonly used by consumers to transport fuel from fuel supply locations to machines requiring fuel for operation, e.g. lawnmowers. The portable fuel containers are typically equipped with a handle to assist in transportation, a vent to control flow of fuel vapor and makeup air, and a pour spout. The fuel container vent allows air to enter and vapor to exit the portable fuel container. The vent accommodates changing conditions within the portable fuel container resulting from environment changes and fuel usage. In some cases, venting while dispensing fuel from the container is accomplished through a passageway in the pour spout. Furthermore, the portable fuel container may contain an additional access opening for adding fuel to the container at the fuel pump. Alternatively, the fuel container pour spout may be removable to allow adding fuel to the portable fuel container through the spout opening.

Increasing environmental concerns have resulted in fuel containers having devices for limiting fuel emissions while dispensing fuel from the container. However, fuel emissions during transportation and storage of the fuel container remain unaddressed.

SUMMARY OF THE INVENTION

An emissions device for use with a portable fuel container assembly is provided. The emissions device includes an emissions housing configured to be mounted to the portable fuel container. The emissions housing defines at least one device opening. A membrane or a liquid discriminating valve is supported by the emissions housing. The membrane allows the passage of the vapor and prevents liquid from passing through it. An emissions filter is also located within the emissions housing. The emissions filter is located such that vapor exiting through the device opening must pass the emissions filter.

A portable fuel container assembly includes a container defining at least one vent opening. An emissions housing is secured to the container near the at least one vent opening. The emissions housing defines at least one device opening. A membrane is supported by the emissions housing. The membrane allows the passage of the vapor and prevents liquid from passing through it. An emissions filter is also located within the emissions housing. The emissions filter is located such that vapor exiting through the device opening must pass the emissions filter.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
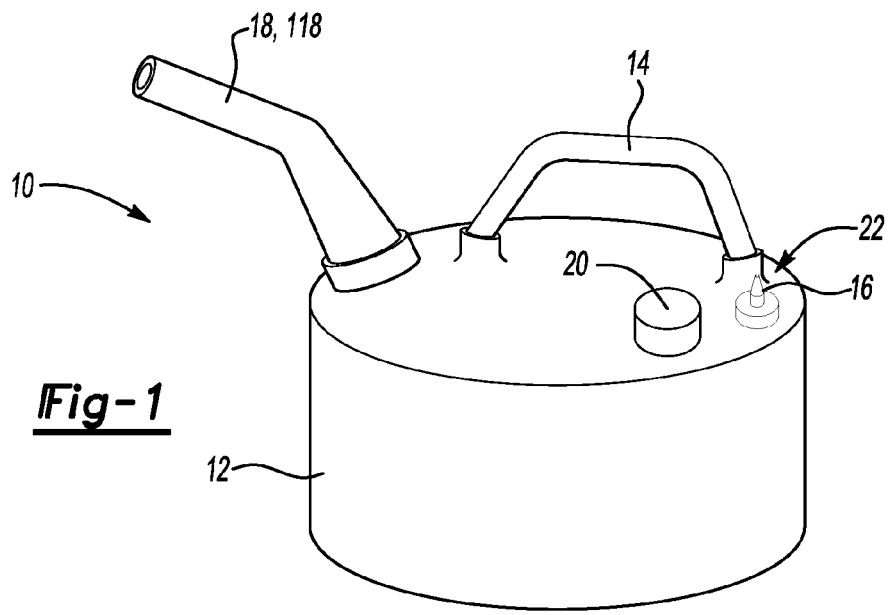
FIG. 1 is a schematic perspective illustration of a portable fuel container.

Referring to the drawings, wherein like reference numbers refer to like components, FIG. 1 shows a portable fuel container assembly 10 having a container 12. The portable fuel container assembly 10 has a handle 14, a vent opening 16, and a pour spout 18. A fuel cap 20 may also be located over a fuel opening (not shown) for adding fuel to the container 12. Alternately, the sealing function of a fuel cap 20 may be replaced with a sealing spout, thus eliminating the need for a second fuel opening 20. An over pressure relief (OPR) valve 22 is assembled within the vent opening 16 to control vapor flow from the portable fuel container assembly 10.

Figure 2:
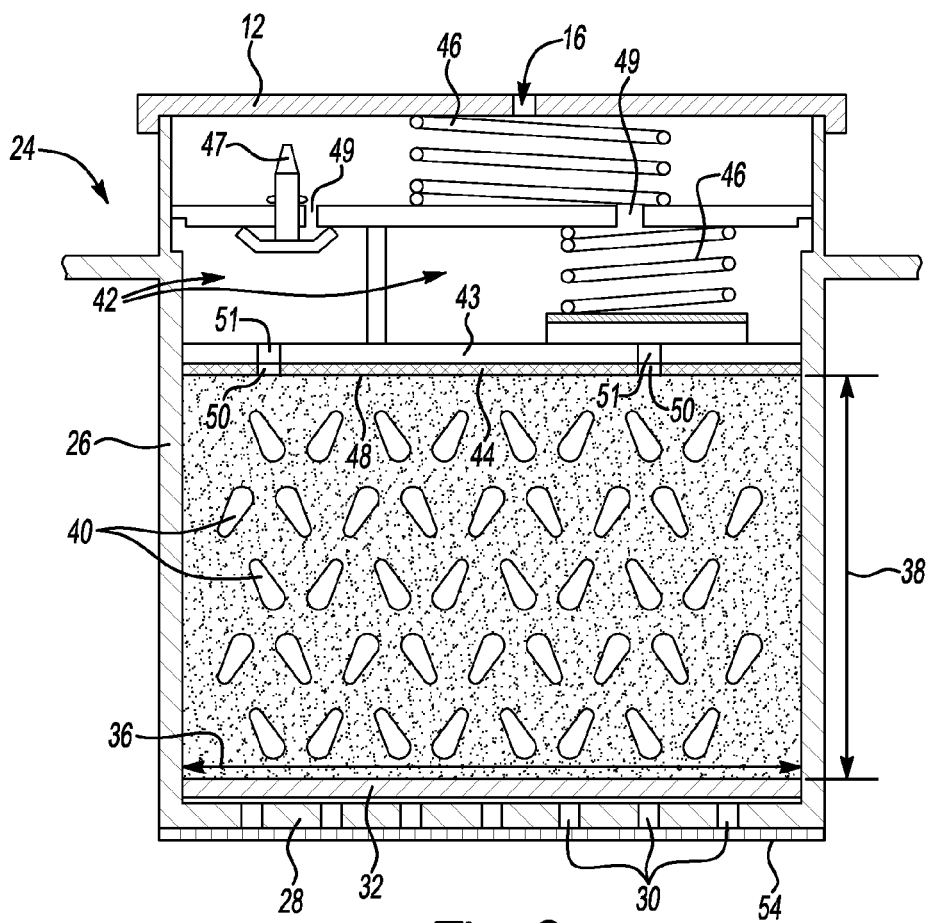
FIG. 2 is a schematic cross-sectional illustration of one embodiment of an emissions control device for use with the portable fuel container of FIG. 1.

Referring to FIG. 2, an enlarged cross-sectional schematic view of a portion of the portable fuel container assembly 10 is shown. An emissions control device 24 is mounted within the portable fuel container assembly 10 to the housing of the container 12. The emissions control device 24 includes a device housing 26 which is secured to the container 12. Alternatively, the device housing 26 may be integrally formed with the container 12. The emissions control device 24 is located such that the vent opening 16 is surrounded by the device housing 26 within the container 12. That is, any vapor within the container 12 enters the device housing 26 to reach the vent opening 16 and the OPR valve 22. Likewise, any fresh air from the outside passes through the vent opening 16 and the vacuum relief opening 49 to enter the container 12.

The emissions control device 24 includes a membrane (or liquid discriminating valve) 32 and a backing plate 28. The backing plate 28 defines a plurality of plate openings 30 through which vapor may enter the emissions control device 24. The membrane 32 is secured to the backing plate 28, which can be integrally formed with the housing 26. That is, the membrane 32 and backing plate 28 are located between the emissions filter 34 and the vapor (and fuel) within the container 12. The membrane 32 may also be secured to the backing plate 28 for additional support, or the membrane 32 may be secured to the backing plate 28, which is then secured to the housing 26.

The membrane 32 is secured to the housing 26 such that the membrane 32 extends over all of the plate openings 30. The membrane 32 is illustrated as a generally flat membrane 32. However, the membrane 32 may also be a cylinder or cone, or it may be pleated or otherwise shaped to increase the surface area of the membrane 32. One skilled in the art would know the proper shape for a membrane 32 for a particular emissions control device 24 and portable fuel container assembly 10.

The membrane 32 is preferably liquid discriminating. That is, the membrane 32 is manufactured from a material that allows vapor to pass through the membrane 32 but blocks liquid from passing through. The membrane 32 may be secured to the housing 26 by welding, adhesive, heat sealing, insert molding, or other methods. One skilled in the art would know the appropriate attachment required for a particular housing 26 and membrane 32 arrangements. Alternatively, as mentioned above, the membrane 32 can be replaced by a liquid discriminating valve.

An emissions filter 34 is located within the device housing 26 and is supported by the backing plate 28. The emissions filter 34 has a width 36 and a depth 38. The emissions filter 34 is wide enough to cover all of the plate openings 30. The emissions filter 34 is formed of a material to remove environmental contaminants 40 from the vapor. For example, the emissions filter 34 may be an activated carbon filter for removing hydrocarbons from the vapor. The vapor entering the device housing 26 flows through the emissions filter 34. After passing through the emissions filter 34 the filtered vapor enters a housing cavity 42. In the embodiment shown, there are multiple housing cavities 42 in fluid communication with the emissions filter 34. The depth 38 of the emissions filter 34 is determined by the type of material forming the emissions filter, the capacity of the container 12, and the desired capacity of the emissions filter 34. The membrane 32 (or the liquid discriminating valve) protect the emissions filter 34 from liquid fuel, which would otherwise damage the ability of the emissions filter 34 to capture environmental contaminants 40, as is known by those skilled in the art.

A filter cover 44 is located above the emissions filter 34 within the housing 26. At least one spring 46 is arranged between the emissions filter 34 and the housing 26 or the container 12, as shown. The spring 46 applies a force to the compression plate 43 and filter cover 44. Due to the force applied by the spring 46, the compression plate 43 and filter cover 44 apply a generally even force over a surface 48 of the emissions filter 34. The force on the emissions filter 34 assists in compressing the emissions filter 34 to extend the life of the emissions filter 34.

The filter cover 44 may include a plurality of cover openings 50 to allow the vapor to pass through the emissions filter 34 to the housing cavity 42. Likewise, the compression plate 43 may include a plurality of plate openings 51 to allow the vapor to pass through the emissions filter 34 to the housing cavity 42.

Thus, vapor exiting the container 12 through the vent opening 16 passes through the membrane 32 and the plurality of plate openings 30 to enter the housing 26. Once the vapor is within the housing 26, it passes through the emissions filter 34, prior to entering the housing cavity 42. The filtered vapor remains within the housing cavity 42 until sufficient pressure builds to open the OPR valve 22 (shown in FIG. 1) and to vent the filtered vapor from within the housing cavity 42. As a result of the emissions device 24 being mounted to the container 12, the vapor exiting the container 12 through the vent opening 16 has been filtered of environmental contaminants 40.

Vapor stored in the emissions filter 34 is desorbed when fresh air enters the emissions device 24 through the vent hole 16, past the vacuum relief opening 49 and the vacuum relief device 47. The fresh air then passes through the emissions filter 34 back into the container 12. Fresh air entering the container 12 through the emissions device 24 occurs when makeup air is required to replace the volume previously occupied by fuel dispensed from the fuel container assembly 10 or through cooling occurring during normal diurnal cycles.

The emissions control device 24 may further include an additional coarse filter 54. The coarse filter 54 may assist in preventing liquid and larger contaminants from reaching the membrane 32. When the membrane 32 is exposed to liquid, the liquid may slow the flow rate of the vapor through the membrane 32. Thus, the coarse filter 54 may deter liquid from reaching the membrane 32 and help maintain the vapor flow rate through the membrane 32.

Figure 3:
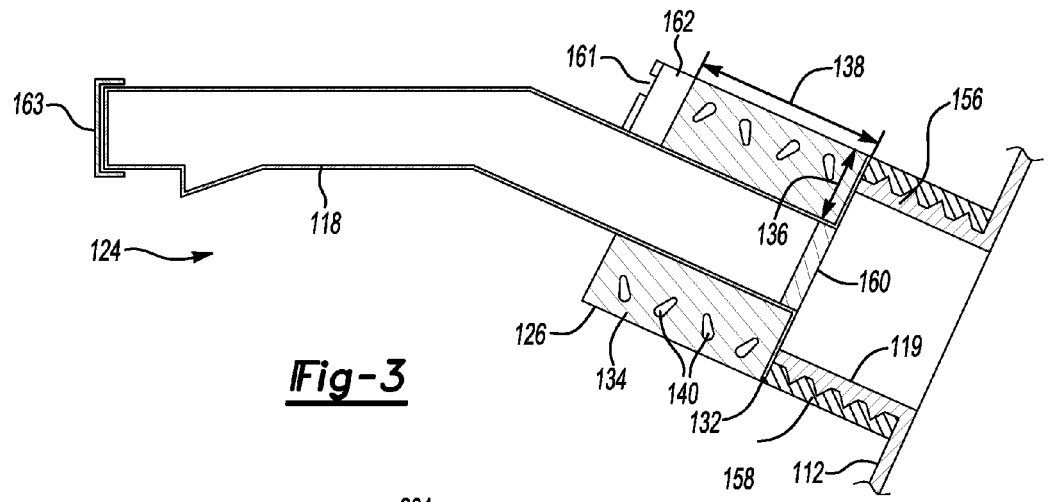
FIG. 3 is a schematic cross-sectional illustration of a second embodiment of an emissions control device for the pour spout of the portable fuel container of FIG. 1.

FIG. 3 illustrates a second embodiment of an emissions control device 124 incorporated into the pour spout 118 for the portable fuel container assembly 10 (illustrated in FIG. 1). The container 112 has a threaded container portion 156 and the pour spout 118 has a threaded spout portion 158. The threaded spout portion 158 may be received by the threaded container portion 156 to retain the pour spout 118 to the container 112. An emissions control device 124 is secured to the pour spout 118 outside the container 112.

The emissions control device 124 includes an emissions filter 134 within a housing 126. The emissions filter 134 is formed of a material to remove environmental contaminants 140 from the vapor as the vapor flows through the emissions filter 134. For example, the emissions filter 134 may be a carbon filter for removing hydrocarbons from the vapor. The emissions filter 134 has a width 136 and a depth 138. The width 136 of and the depth 138 of the emissions filter 134 are determined by the type of material forming the emissions filter, the capacity of the container 112, and the desired capacity of the emissions filter 134. Vapor exiting the container 112 passes through the emissions filter 134. When the pour spout 118 is sealed (for storage of the fuel container assembly 10), vapor will exit the container 112 through a vent port 161. The pour spout 118 may include a liquid discriminating vapor permeable membrane 132 that allows the vapor to enter the emissions filter 134 and prevents liquid from passing through and reaching the emissions filter 134. As the vapor passes through the emissions filter 134, the environmental contaminants 140 are adsorbed by the emissions filter 134.

The portable fuel container assembly 10 or the emissions device 124 may also include a pressure relief valve 162. The pressure relief valve 162 may be used to seal the pour spout 118 during storage or non-use of the portable fuel container assembly 10.

The portable fuel container assembly 10 or the emissions device 134 may also include a sealing valve 160 or a sealing cap 163, to prevent spilling of liquid from the container 112. Thus, the pour spout 118 would be sealed by the sealing valve 160 or the sealing cap 163 during storage or non-use, and the emissions filter 134 would filter vapor during storage or non-use of the portable fuel container assembly 10. The emissions filter 134 may be used instead of or in conjunction with the emissions filter 34 of the above embodiment.

Furthermore, based upon the design of the container 112, the emissions filter 134 may be located in the pour spout 118 such that the emissions filter 134 is located above a fuel line of fuel within the container 112. A vapor dome of the container 112 is the interior portion of the container 112 that is above the fuel line of the fuel within the container 112. Depending on the design of the container 112, it may be necessary to use a breather line (not shown) to connect the vapor dome within the container 112 to the pour spout 118. It may also be desirable, in some cases, to move the inlet for fresh air during refueling to the tip of the dispensing nozzle. This would prevent makeup air from slowing or stopping the flow of fuel from the refueling container when the fuel level in the container 12 reaches the tip of the dispensing nozzle, thereby reducing the chance for fuel spillage.

Figure 4:
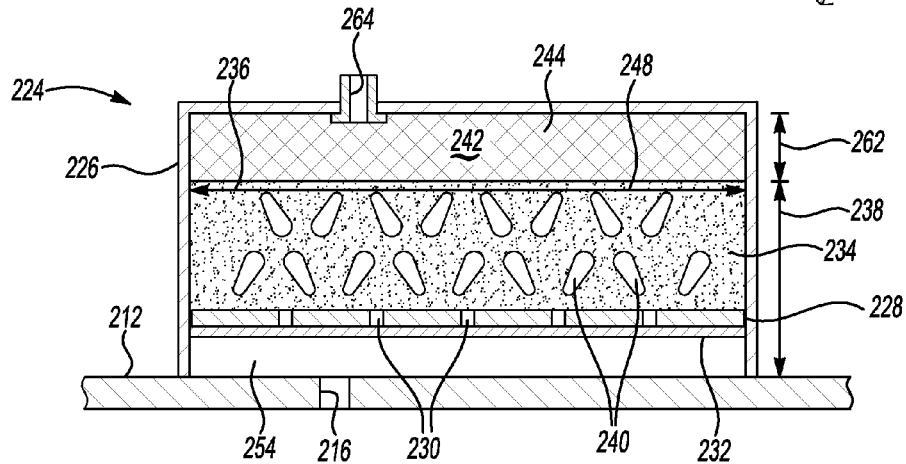
FIG. 4 is a schematic perspective cross-sectional illustration in partial cross-sectional view of a third embodiment of an emissions control device for the portable fuel container of FIG. 1.

FIG. 4 illustrates a third embodiment of an emissions control device 224 for the portable fuel container assembly 10 (illustrated in FIG. 1). The emissions control device 224 is mounted on the container 212. The emissions control device 224 includes a device housing 226, which is secured to the container 212. Alternatively, the device housing 226 may be integrally formed with the container 212 either inside or outside the main body of the container 212. The emissions control device 224 is located such that the vent opening 216 in the container 212 is surrounded by the device housing 226. That is, any vapor within the container 212 enters the device housing 226 after passing through the vent opening 216.

The emissions control device 224 includes a backing plate 228. The backing plate 228 defines a plurality of plate openings 230 through which vapor may enter the emissions control device 224. A membrane 232 is secured to the device housing 226 below the backing plate 228. That is, the membrane 232 is located between the backing plate 228 and the vent opening 216. The membrane 232 may also be secured to the backing plate 228 for additional support, or the membrane 232 may be secured to the backing plate 228 which is then secured to the device housing 226.

The membrane 232 is secured to the device housing 226 such that the membrane 232 extends over the plurality of plate openings 230. The membrane 232 is illustrated as a generally flat membrane 232. However, the membrane 232 may also be a cylinder, may be pleated, or may be otherwise shaped to increase the surface area of the membrane 232. One skilled in the art would know the proper shape for a membrane 232 for a particular emissions control device 224 and portable fuel container assembly 10.

The membrane 232 is preferably of a material that allows vapor to pass through the membrane 232 but prohibits liquid from passing through. The membrane 232 may be secured to the device housing 226 by welding, adhesive, heat sealing, insert molding, or other methods. One skilled in the art would know the appropriate attachment required for a particular device housing 226 and membrane 232 arrangement.

An emissions filter 234 is located within the device housing 226 and is supported by the backing plate 228. The emissions filter 234 has a width 236 and a depth 238. The width 236 of the emissions filter 234 is sufficient to cover all of the plurality of plate openings 230. The emissions filter 234 is formed of a material to remove environmental contaminants 240 from the vapor. For example, the emissions filter 234 is an activated carbon filter for removing hydrocarbons from the vapor. The vapor entering the device housing 226 must flow through the emissions filter 234. After passing through the emissions filter 234 the filtered vapor enters a housing cavity 242. The depth 238 of the emissions filter 234 is determined by the type of material forming the emissions filter 234, the capacity of the container 212, and the desired capacity of the emissions filter 234.

A filter cover 244 is located above the emissions filter 234 within the device housing 226. In the embodiment shown, the filter cover 244 is a layer of porous foam that fills the housing cavity 242 and allows vapor to pass through the filter cover 244. The filter cover 244 has a cover thickness 262 to maintain a generally even force over a surface 248 of the emissions filter 234. The force on the emissions filter 234 by the filter cover 244 assists in compressing the emissions filter 234 to extend the life of the emissions filter 234 over time.

Vapor exiting the container 212 through the vent opening 216 must pass through the membrane 232 and the plurality of plate openings 230. Then the vapor passes through the emissions filter 234 prior to entering the housing cavity 242, which is filled with the porous foam of the filter cover 244. The vapor remains within the housing cavity 242 until exiting the device housing 226 through a device opening 264. As a result, the vapor exiting the container 12 through the vent opening 216 has been filtered by the emissions control device 224 of environmental contaminants 240. Likewise, fresh air entering the container 12 must pass through a device opening 264, into the device housing 226, and through the filter cover 244 to the emissions filter where it desorbs the stored environmental contaminants 240 (i.e. the hydrocarbons) before entering the container 212.

The emissions control device 224 may further include an additional coarse filter 254. The coarse filter 254 may assist in preventing liquid and larger contaminants from reaching the membrane 232. As the membrane 232 is exposed to liquid, the liquid may slow the flow rate of the vapor through the membrane 232. Thus, the coarse filter 254 may deter liquid from reaching the membrane 232 and help to maintain the vapor flow rate through the membrane 232.

Figure 5:
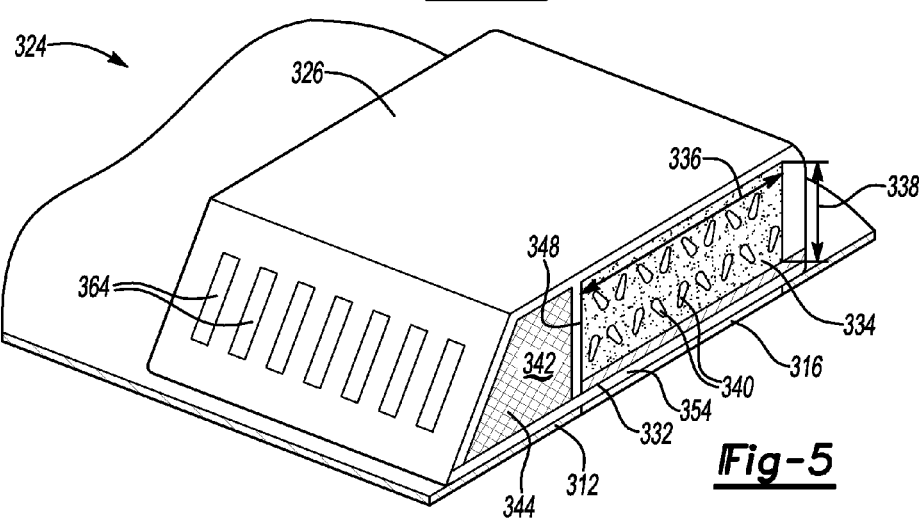
FIG. 5 is a schematic perspective cross-sectional illustration in partial cross-sectional view of a fourth embodiment of an emissions control device for use with the portable fuel container of FIG. 1.

FIG. 5 illustrates a fourth embodiment of an emissions control device 324 for the portable fuel container assembly 10 (illustrated in FIG. 1). The emissions control device 324 may be mounted externally of the container 312. The emissions control device 324 includes a device housing 326 which is mounted on or secured to the container 312. Alternatively, the device housing 326 may be integrally formed with the container 312. The emissions control device 324 is located such that the device housing 326 is near the vent opening 316 in the container 312. That is, any vapor within the container 312 must enter the device housing 326 after exiting from the vent opening 316.

The emissions control device 324 includes a membrane 332 that is secured to the device housing 326. The membrane 332 is illustrated as a generally flat membrane 332. However, the membrane 332 may also be a cylinder, may be pleated, or may otherwise be shaped to increase the surface area of the membrane 332. One skilled in the art would know the proper shape for a membrane 332 for a particular emissions control device 324 and portable fuel container assembly 10.

The membrane 332 is preferably of a material that allows vapor to pass through the membrane 332 but prohibits liquid from passing through. The membrane 332 may be secured to the device housing 326 by weld, adhesive, heat sealing, insert molding, or other methods. One skilled in the art would know the appropriate attachment required for particular device housing 326 and membrane 332 arrangements.

An emissions filter 334 is located within the device housing 326. The emissions filter 334 is formed of a material to remove environmental contaminants 340 from the vapor. For example, the emissions filter 334 is a carbon filter for removing hydrocarbons from the vapor. The vapor entering the device housing 326 must flow through the emissions filter 334. After passing through the emissions filter 334, the filtered vapor enters a housing cavity 342. The emissions filter 334 has a width 336 and a depth 338. The width 336 and depth 338 of the emissions filter 334 is determined by the type of material forming the emissions filter, the capacity of the container 312, and the desired capacity of the emissions filter 334.

A filter cover 344 is located adjacent to the emissions filter 334, within the device housing 326. In the embodiment shown, the filter cover 344 is a layer of porous foam that fills the housing cavity 342 and allows vapor to pass through the filter cover 344. The filter cover 344 maintains a generally even force over a surface 348 of the emissions filter 334. The force on the emissions filter 334 by the filter cover 344 assists in compressing the emissions filter 334 to extend the life of the emissions filter 334 over time.

Vapor exiting the container 312 through the vent opening 316 passes through the membrane 332. Then the vapor passes through the emissions filter 334 prior to entering the housing cavity 342, which is filled with the porous foam of the filter cover 344. The vapor remains within the housing cavity 342 until exiting the device housing 326, through at least one device opening 364. As a result, the vapor exiting the container 312 through the vent opening 316 has been filtered by the emissions control device 324 of environmental contaminants 340. Fresh air would follow the reverse path, entering the emissions device 324 through the at least one device opening 364 before passing through the emissions filter 334, where the emissions filter 334 desorbs the stored environmental contaminants 340 (i.e. the hydrocarbons). The environmental contaminants 340 return to the container 12 through the vent opening 316.

The emissions control device 324 may further include an additional coarse filter 354. The coarse filter 354 may assist in preventing liquid and larger contaminants from reaching the membrane 332. As the membrane 332 is exposed to liquid, the liquid may slow the flow rate of the vapor through the membrane 332. Thus, the coarse filter 354 may deter liquid from reaching the membrane 332 and help to maintain the vapor flow rate through the membrane 332.

Figure 6:
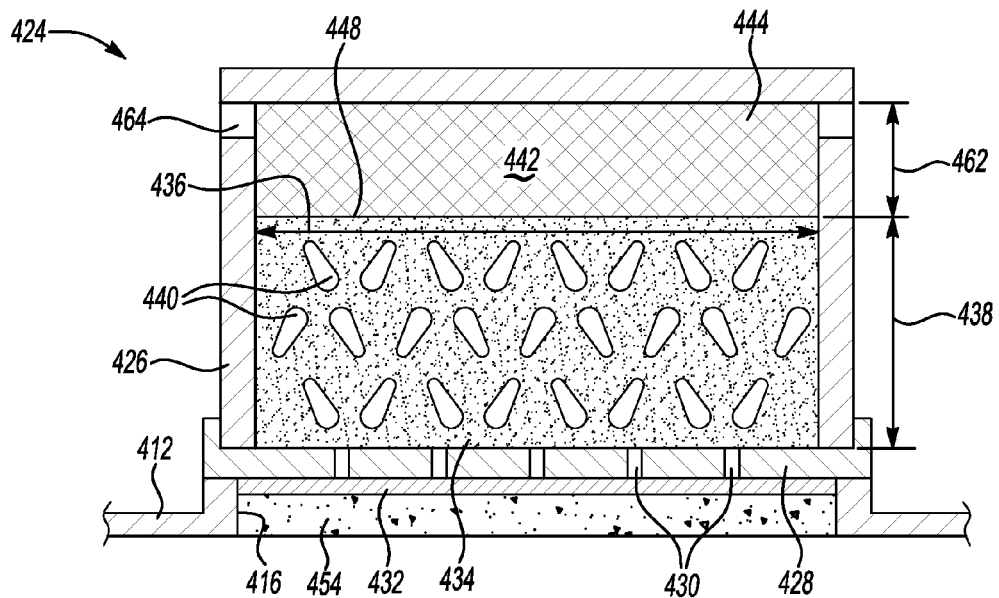
FIG. 6 is a schematic cross-sectional illustration of a fifth embodiment of an emissions control device for use with the portable fuel container of FIG. 1.

FIG. 6 illustrates a fifth embodiment of an emissions control device 424 for the portable fuel container assembly 10 (illustrated in FIG. 1). The emissions control device 424 may be mounted externally of the container 412. The emissions control device 424 includes a device housing 426, which is secured to the container 412. The emissions control device 424 is located such that the vent opening 416 in the container 412 is surrounded by the device housing 426. That is, any vapor within the container 412 must enter the device housing 426 after exiting from the vent opening 416. The emissions control device 424 includes a backing plate 428.

Figure 7A:
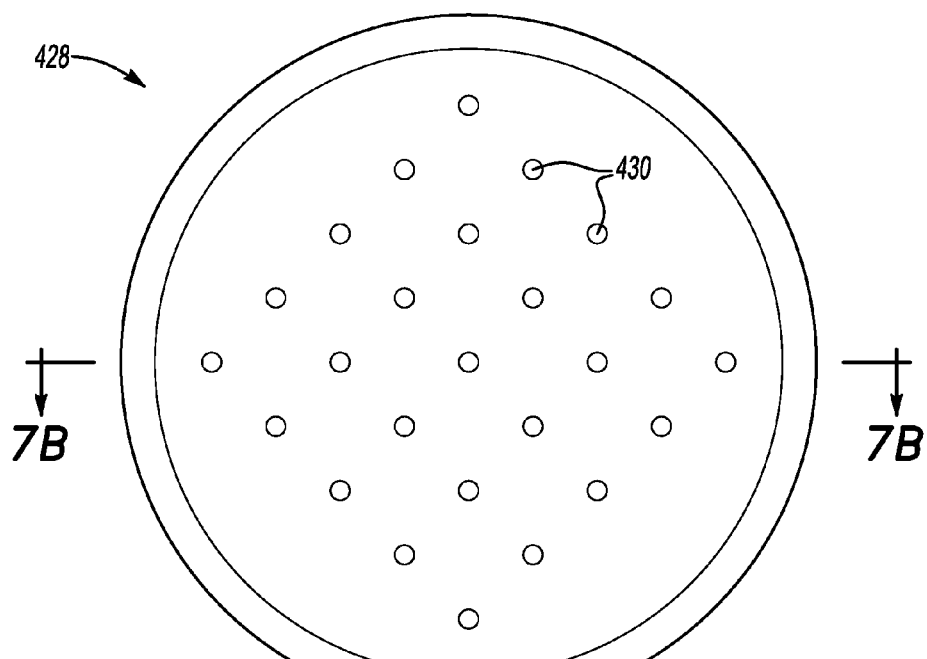
FIG. 7A is a schematic top view illustration of a sixth embodiment of an emissions control device for use with the portable fuel container of FIG. 1.
Figure 7B:
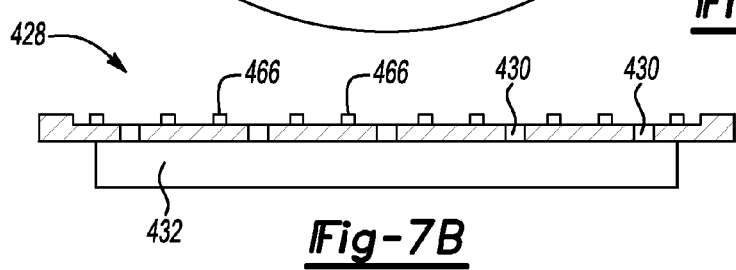
FIG. 7B is a schematic cross-sectional view illustration of the sixth embodiment of the emissions control device of FIG. 7A taken at lines 7B-7B for use with the portable fuel container of FIG. 1.
Figure 7C:
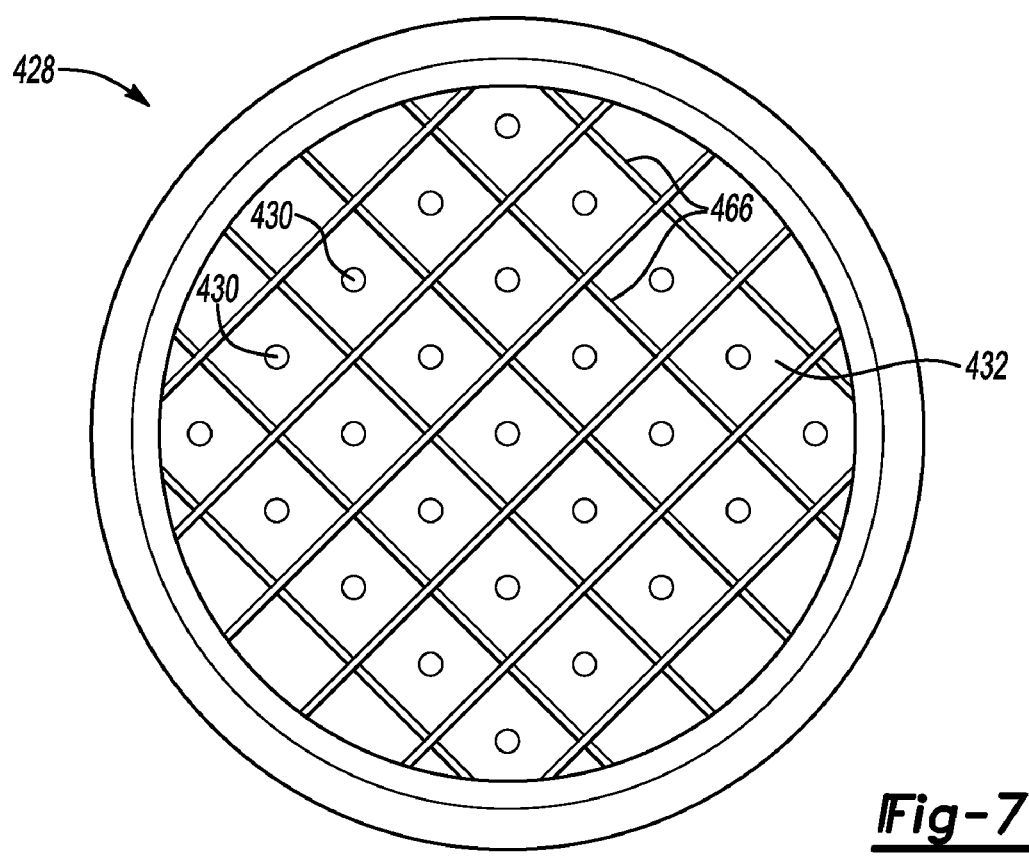
FIG. 7C is a schematic bottom view illustration of the sixth embodiment of the emissions control device for use with the portable fuel container of FIGS. 1, 7A and 7B.

FIGS. 7A-7C illustrate the backing plate 428. The backing plate 428 defines a plurality of plate openings 430 through which vapor may enter the emissions control device 424. A membrane 432 is secured to the backing plate 428 and the backing plate 428 is secured to the device housing 426 (shown in FIG. 6). In the embodiment shown, the membrane 432 is located within the vent opening 416 (shown in FIG. 6). The backing plate 428 may also have strengthening ribs 466 for additional support.

The membrane 432 is secured to the backing plate 428 such that the membrane 432 extends over all of the plurality of plate openings 430. The membrane 432 is illustrated as a generally flat membrane 432. However, the membrane 432 may also be a cylinder, may be pleated, or may be otherwise shaped to increase the surface area of the membrane 432. One skilled in the art would know the proper shape for a membrane 432 for a particular emissions control device 424 and portable fuel container assembly 10.

The membrane 432 is preferably of a material that allows vapor to pass through the membrane 432 but prohibits liquid from passing through. The membrane 432 may be secured to the backing plate 428 by welding, adhesive, heat sealing, insert molding, or other methods. One skilled in the art would know the appropriate attachment required for a particular backing plate 428 and membrane 432 arrangements.

Referring back to FIG. 6, an emissions filter 434 is located within the device housing 426 and may be supported by the backing plate 428. The emissions filter 434 has a width 436 and a depth 438. The width 436 of the emissions filter 434 is sufficient to cover all of the plurality of plate openings 430. The emissions filter 434 is formed of a material to remove environmental contaminants 440 from the vapor. For example, the emissions filter 434 is a carbon filter for removing hydrocarbons from the vapor. The vapor entering the device housing 426 flows through the emissions filter 434. After passing through the emissions filter 434 the filtered vapor enters a housing cavity 442. The depth 438 of the emissions filter 434 is determined by the type of material forming the emissions filter, the capacity of the container 412, and the desired capacity of the emissions filter 434.

A filter cover 444 is located above the emissions filter 434 within the device housing 426. In the embodiment shown, the filter cover 444 is a layer of porous foam that fills the housing cavity 442 and allows vapor to pass through the filter cover 444. The filter cover 444 has a cover thickness 462, to maintain a generally even force over a surface 448 of the emissions filter 434. The force on the emissions filter 434 by the filter cover 444 assists in compressing the emissions filter 434 to extend the life of the emissions filter 434 over time.

Vapor exiting the container 412 through the vent opening 416 passes through the membrane 432 and the plurality of plate openings 430. Then, the vapor passes through the emissions filter 434 before entering the housing cavity 442, which is filled with the porous foam of the filter cover 444. The filtered vapor remains within the housing cavity 442 until exiting the device housing 426 through a device opening 464. As a result, the vapor exiting the container 12 through the vent opening 416 has been filtered of environmental contaminants 440 by the emissions control device 424. Fresh air would follow the reverse path, entering the emissions device 424 through at least one opening 464 before passing through the emissions filter 434, where the emissions filter 434 desorbs the stored environmental contaminants 440 (i.e. the hydrocarbons). The environmental contaminants 440 returned to the container 12 through the vent opening 416.

The emissions control device 424 may further include an additional coarse filter 454. In the embodiment shown, the coarse filter is located within the vent opening 416 below the membrane 432. The coarse filter 454 is supported by the backing plate 428 and the membrane 432 or may be secured to the container 412. The coarse filter 454 may assist in preventing liquid and larger contaminants from reaching the membrane 432. As the membrane 432 is exposed to liquid, the liquid may slow the flow rate of the vapor through the membrane 432. Thus, the coarse filter 454 deters liquid from reaching the membrane 432 to help maintain the vapor flow rate through the membrane 432.

While the best modes for carrying out the invention have been described in detail, those familiar with the art to which this invention relates will recognize various alternative designs and embodiments for practicing the invention within the scope of the appended claims.

The invention claimed is:

1. An emissions device for use with a portable fuel container comprising:
a housing configured to be mounted to the portable fuel container, wherein the housing defines an opening;

a liquid discriminating valve attached to the housing, wherein the liquid discriminating valve is configured to allow passage of vapor and prevent passage of liquid;

a first filter located within the housing such that vapor exiting through the liquid discriminating valve passes through the first filter; and a sealing valve positioned in parallel with the liquid discriminating valve over the opening and configured to prevent the passage of liquid and vapor.

2. The emissions device of claim 1, wherein the first filter is configured to adsorb hydrocarbons.

3. The emissions device of claim 1, further comprising:

a vent port in fluid communication with the first filter such that vapor passes through the vent port after passing through the first filter.

4. The emissions device of claim 1, further comprising:

a pressure relief valve in fluid communication with the first filter such that vapor passes through the pressure relief valve after passing through the first filter.

5. The emissions device of claim 1, wherein the first filter is annular and surrounds the opening.

6. A portable fuel container assembly comprising:

a container defining a pour spout opening;

a housing secured to the container proximate to the pour spout opening;

a membrane located adjacent to the pour spout opening, wherein the membrane is configured to allow the passage of vapor and prevent the passage of liquid a filter located within the housing such that vapor exiting through the membrane passes through the filter;

a pour spout defining a first threaded portion surrounding the pour spout opening;

a second threaded portion defined by the container and configured to receive the first threaded portion defined by the pour spout;

wherein the housing extends from and mates with the pour spout; and a spout valve to selectively block liquid and vapor from exiting through the pour spout.

7. The portable fuel container assembly of claim 6, wherein the housing is mounted externally on the container.

8. The portable fuel container assembly of claim 6, further comprising:

a vent port in fluid communication with the first filter such that vapor passes through the vent port after passing through the first filter.

9. The portable fuel container assembly of claim 6, further comprising:

a pressure relief valve in fluid communication with the filter such that vapor passes through the pressure relief valve after passing through the filter.

10. The portable fuel container assembly of claim 6, wherein the filter is annular and surrounds the pour spout opening.

11. The portable fuel container assembly of claim 6, wherein the filter is configured to adsorb hydrocarbons.

12. A container assembly comprising:

a container defining an opening;

a pour spout positioned at the opening;

a membrane positioned in parallel with the pour spout at the opening; wherein the membrane is configured so that vapor that passes through the opening can pass through the membrane but liquid that passes through the opening cannot pass through the membrane;

a filter positioned so that vapor that passes through the membrane must pass through the filter; and a sealing valve positioned at the opening and configured so that the sealing valve covers a portion of the opening and the membrane covers a remaining portion of the opening; wherein the sealing valve is selectively openable to permit liquid to pass out of the container through the pour spout.

13. The container assembly of claim 12, wherein the filter is configured to adsorb hydrocarbons.

14. The container assembly of claim 12, further comprising:

a vent port in fluid communication with the filter such that vapor passes through the vent port after passing through the filter.

15. The container assembly of claim 12, further comprising:

a pressure relief valve in fluid communication with the first filter such that vapor passes through the pressure relief valve after passing through the first filter.

16. The container assembly of claim 12, wherein the filter surrounds the pour spout.

17. The container assembly of claim 12, wherein the pour spout has a first threaded portion and the container has a second threaded portion configured to receive the first threaded portion.

* * * * *